(No Model.) 2 Sheets—Sheet 1.
F. COOK.
APPARATUS FOR DRYING FRUIT, VEGETABLES, GRAIN AND ANALOGOUS ARTICLES.
No. 264,246. Patented Sept. 12, 1882.
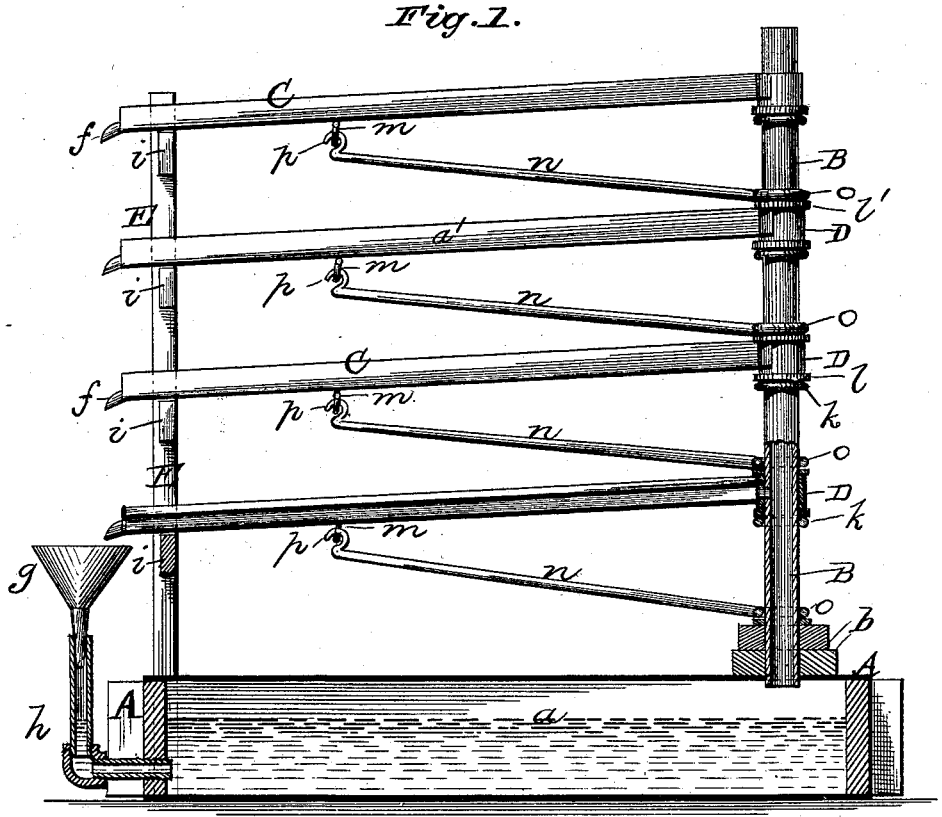
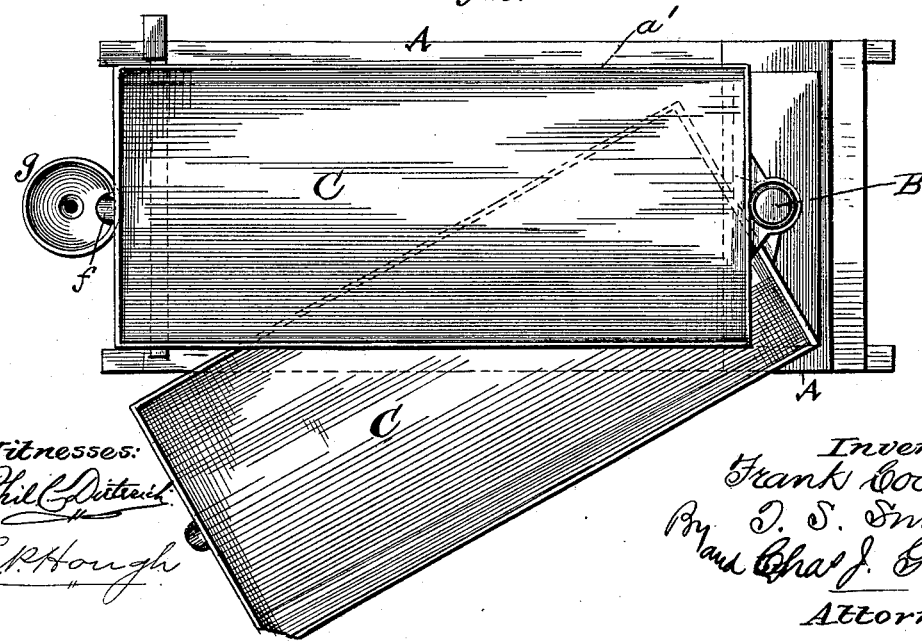

(No Model.) 2 Sheets—Sheet 2.
F. COOK.
APPARATUS FOR DRYING FRUIT, VEGETABLES, GRAIN AND ANALOGOUS ARTICLES.
No. 264,246. Patented Sept. 12, 1882.
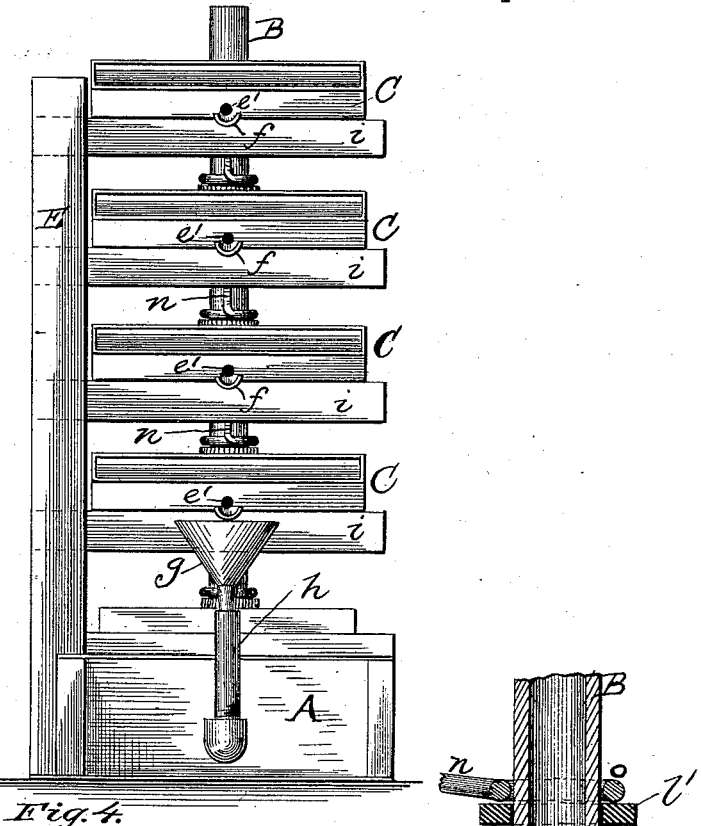
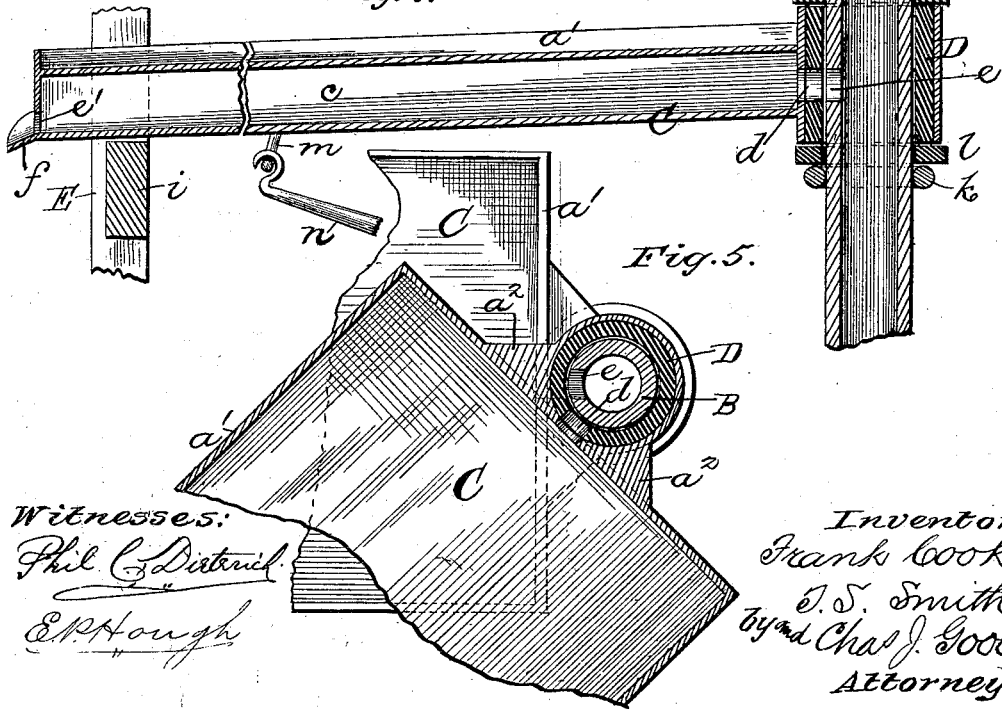
Witnesses:
Phil C. Dietrich
E. P. Hough
Inventor:
Frank Cook
J. S. Smith
by and Chas. J. Gooch
Attorneys

UNITED STATES PATENT OFFICE.

FRANK COOK, OF CLEMMONSVILLE, NORTH CAROLINA.

APPARATUS FOR DRYING FRUIT, VEGETABLES, GRAIN, AND ANALOGOUS ARTICLES.

SPECIFICATION forming part of Letters Patent No. 264,246, dated September 12, 1882.

Application filed July 21, 1882. (No model.)

*To all whom it may concern:*

Be it known that I, FRANK COOK, a citizen of the United States of America, residing at Clemmonsville, in the county of Davidson and State of North Carolina, have invented certain new and useful Improvements in Apparatus for Drying Fruit, Vegetables, Grain, and Analogous Articles, of which the following is a specification, reference being had therein to the accompanying drawings.

This invention relates to machines or apparatus for steam-drying fruits, vegetables, and grain; and it consists in certain improvements in the construction and arrangement of parts, as hereinafter described and claimed.

In the drawings, Figure 1 represents a front elevation, partly in section, of my improved device. Fig. 2 represents a top plan view thereof, with the top tray shown as turned out of alignment, for a purpose to be presently described. Fig. 3 represents a side elevation of the device. Fig. 4 is an enlarged detail sectional view, showing one of the trays and the steam-supply pipe and parts connecting the same together. Fig. 5 represents an enlarged plan view, partly in section and broken away, of the trays and the arrangement by which the supply of steam thereto is admitted or cut off.

A represents a water tank or boiler, which may be oblong, as shown in the drawings, or of any other desired shape, and constructed out of any suitable metal or material. $a$ represents the water therein. In use heat is applied to the bottom of this tank or boiler A, either by placing such tank upon a furnace or other heating medium or otherwise, and the water $a$ heated until steam is generated.

B represents a hollow tube or pipe, whose lower end passes through the top of the tank A, as shown, and is supported or braced in position thereon by braces or stays $b$.

C C represent hollow trays, upon the upper outer surface of which the fruit, vegetables, grain, or analogous articles to be dried are placed. Each tray has a flange, $a'$, to hold the fruit, &c., in position thereon. The rear or inner end of each tray is provided with ears or lugs $a^2$, which engage with a circumferential sleeve, D, having at that portion in line with the chamber $c$ in the tray an opening, $d$, which, when the tray is in position and in alignment, will be in line with a similar opening, $e$, in the pipe or tube B, so that upon steam being generated in the tank or boiler A such steam ascending the pipe B, it will pass through said openings $e$ and $d$ into the space $c$ and heat the upper surface of the tray C, and thereby dry the material thereon. The water of condensation from the steam passes off through openings $e'$ and the spouts $f$ to the funnel $g$, from whence it is conveyed through the pipe $h$ to the tank or boiler A, for reconversion into steam and reuse. The forward end of such tray is supported upon horizontal extensions $i$ of a vertical standard or post, E, secured at its lower end to the tank or boiler A. The pipe B is formed with encircling rings $k$ below each opening $e$. A washer, $l$, is slipped over the tube B and down upon each of said rings $k$. The sleeves D are then similarly slipped over and down the tube until they rest upon said washers. Then the trays are, through their ears or lugs $a^2$, secured to said sleeves, and additional washers, $l'$, are slipped down the tube until they rest upon the tops of the sleeves D. These sleeves have free rotary movement upon the tube B, so that when it is desired to cut off the supply of steam to any one or more of the trays all that is necessary is to turn the forward end of such tray sidewise, as shown in Figs. 2 and 5 of the drawings, when the opening $d$, communicating with the interior $c$ thereof, will be turned out of alignment with the opening $e$ in the tube and a plain or solid portion of the sleeve brought over said opening $e$, so as to cover it, as clearly shown in Fig. 5, thereby completely cutting off from such tray C the supply of steam.

Depending downwardly from the bottom of each tray is an eye, $m$, with which the hook $p$ of a rod, $n$, engages, the opposite end of said rod being swiveled upon the tube B by an eye, $o$, to admit of its readily moving in a horizontal direction upon the tray being turned outward. When the tray is turned outward and away from its support $i$ said rod will sustain such tray in its turned position and prevent its sagging down. The eye $o$ of each rod rests upon the upper washer, $l'$, and has bearing thereon.

The proper amount of water $a$ having been placed in the tank or boiler A, (which may be done by pouring such water through the pipe $h$ or in any other suitable way,) said boiler, with its attached trays, &c., is placed upon or brought into contact with the heating device. The fruit, vegetables, or grain or other articles to be dried are then placed upon the trays C, which are placed in the position shown in Figs. 1 and 3 of the drawings, with their outer ends resting upon the supports $i$. Then as steam is generated it will ascend the pipe B and pass through the openings $e\ d$ into the trays C, and, heating them, dry the material thereon. Such material, during the process of drying, can be readily stirred or turned when desired, as the trays are within ready reach of the party operating the drier.

Any number of trays may be employed and any desired quantity of material dried at one time, as if it is desired to use one, two, or more trays only, instead of the entire number on the drier, or if the material on any of them is sufficiently dried, such trays as it is not desired to use, or such as it is not desired to admit steam to, can be readily turned aside and the steam cut off therefrom.

Having thus described my invention, what I claim therein is—

1. The combination, with a steam-generating tank, A, of steam-conveying pipe B, having openings $e$, and hollow trays C, having openings $d$ and pivotally mounted upon said pipe B, substantially as and for the purpose set forth.

2. The combination, with a steam-generating tank, A, and pipe B, having openings $e$ and rings $k$, of the hollow trays C, having openings $d$ and $e'$, and the condensed-steam receiver $g\ h$, substantially as and for the purpose set forth.

3. In combination with a steam-generating tank, A, and steam-conveying pipe B, the hollow tray or trays C, communicating with said pipe B, and provided with a suitable support, $i$, at the outer end, and having a sleeve, D, pivotally mounted upon said pipe B at the opposite end, the eye $m$, and the rod $n\ o\ p$, substantially as and for the purpose set forth.

In testimony whereof I affix my signature in presence of two witnesses.

FRANK COOK.

Witnesses:
 CHAS. J. GOOCH,
 L. C. YOUNG.